US009981602B2

(12) United States Patent
Vincent et al.

(10) Patent No.: US 9,981,602 B2
(45) Date of Patent: May 29, 2018

(54) SYSTEM AND METHOD FOR PEDESTRIAN ALERT (71) Applicant: 2236008 Ontario Inc., Waterloo (CA)

(72) Inventors: Robert Vincent, Ottawa (CA); Leonard Charles Layton, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days. days.

(21) Appl. No.: 15/242,150

(22) Filed: Aug. 19, 2016

(65) Prior Publication Data
US 2018/0050635 A1  Feb. 22, 2018

(51) Int. Cl.
*B60Q 5/00* (2006.01)
(52) U.S. Cl.
CPC .................... *B60Q 5/006* (2013.01)
(58) Field of Classification Search
CPC ....................................... B60Q 5/006
See application file for complete search history.

(56) References Cited

U.S. PATENT DOCUMENTS

| 9,135,798 | B2 | 9/2015 | Sakagami et al. |
| 9,233,659 | B2 | 1/2016 | Rosenbaum et al. |
| 9,718,405 | B1 * | 8/2017 | Englander ............... B60Q 9/008 |
| 2013/0058116 | A1 | 3/2013 | Galbas et al. |
| 2015/0035685 | A1 * | 2/2015 | Strickland ............... B60Q 9/008 340/901 |
| 2015/0329043 | A1 * | 11/2015 | Skvarce ................ B60Q 9/008 340/435 |
| 2016/0304027 | A1 * | 10/2016 | Di Censo ................. B60Q 5/00 |
| 2016/0325676 | A1 * | 11/2016 | Yamada ................. G08G 1/166 |

OTHER PUBLICATIONS

International Search Report corresponding to International Application No. PCT/CA2017/050976 dated Aug. 18, 2017 dated Oct. 25, 2017, 3 pages.
Written Opinion of the International Searching Authority corresponding to International Application No. PCT/CA2017/050976 dated Nov. 1, 2017, 3 pages.

* cited by examiner

*Primary Examiner* — Leon Flores
(74) *Attorney, Agent, or Firm* — Brinks Gilson & Lione (57) ABSTRACT A system and method for pedestrian alert that derives a pedestrian path representing a projected path for a pedestrian, derives a vehicle path representing a projected path for a motor vehicle, determines an intersection of the pedestrian path and the vehicle path, determines alert characteristics responsive to the determined intersection, and generates an alert that is emitted from the vehicle responsive to the determined alert characteristics. The system and method for pedestrian alert may be built, installed or implemented in a motor vehicles that is operated in environments where the motor vehicle may be in close proximity to pedestrians. The system and method for pedestrian alert mitigates the likelihood of a collision between the motor vehicle and a pedestrian by emitting an alert that may draw the attention of the pedestrian to the presence of the motor vehicle.

27 Claims, 4 Drawing Sheets

SYSTEM AND METHOD FOR PEDESTRIAN ALERT

BACKGROUND

1. Technical Field

The present disclosure relates to the field of automated drive assist systems (ADAS). In particular, to a system and method for pedestrian alert.

2. Related Art

Current pedestrian warning systems, and the legislation that requirements them, are directed to passive systems in which the vehicle emits a warning sound (often synthesized to sound like an internal combustion engine driven vehicle) generally in the direction of travel of the vehicle and usually below some threshold speed (e.g. <30 km/h).

While such warming sounds may be useful when the there are a small number of vehicles in the vicinity of a pedestrian, they are likely less effective in congested urban setting with heavy traffic concentration due to the masking effect created by the confluence of noise emitted by the numerous vehicles.

In addition the current systems assume that the pedestrian is attuned to, and paying attention to, the 'engine like' sounds being emitted.

External alert sounds that warn of the approach of quiet vehicles are an emerging requirement from automakers due to concerns over pedestrian and cyclist safety and because of legislation in several countries. These sounds are typically only produced when the vehicle is moving below a certain speed, but may also adapt in nature (loudness/pitch) depending on speed. Current external alert sounds have limitations such as those described below.

Current external alert sounds are typically replayed at a constant volume irrespective of the noise level in the physical environment around the car. For example very noisy street environments with many conflicting and confusing sound and noise sources can confuse pedestrians and cyclists. Conversely in very quiet environments (such as late at night in a residential neighborhood) loud alert sounds would be disturbing to people around.

Current external alert sounds are not directed toward the intended direction of motion of the vehicle. For example, an existing electric vehicle waiting to turn left across oncoming traffic where there is a pedestrian crossing would have its alert sounds projected forward but the actual intended direction of motion is at a right angle.

Current external alert sounds may not be easily localized. That is, the nature of the sounds used make it difficult for a human being to determine the origin of the sound source.

There is a need for a system and method for pedestrian alert that mitigates or eliminates one or more of the deficiencies described above.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for pedestrian alert that derives a pedestrian path representing a projected path for a pedestrian, derives a vehicle path representing a projected path for a motor vehicle, determines an intersection of the pedestrian path and the vehicle path, determines alert characteristics responsive to the determined intersection, and generates an alert that is emitted from the vehicle responsive to the determined alert characteristics.

The system and method for pedestrian alert may be built, installed or implemented in a motor vehicle such as an automobile, passenger bus, commercial vehicle or other similar motorized vehicles that are operated in environments where they may be in close proximity to pedestrians. The system and method for pedestrian alert mitigates the likelihood of a collision between the motor vehicle and a pedestrian by emitting an alert that may draw the attention of the pedestrian to the presence of the motor vehicle.

While the system and method for pedestrian alert is described referencing a pedestrian, it is to be understood that the system and method are equally applicable with reference to a person riding a bicycle or skateboard, a person in a wheel chair or motorized chair, a pet animal (e.g. a dog), a domesticated animal (e.g. a sheep or cow) or wildlife (e.g. a deer).

Figure 1:
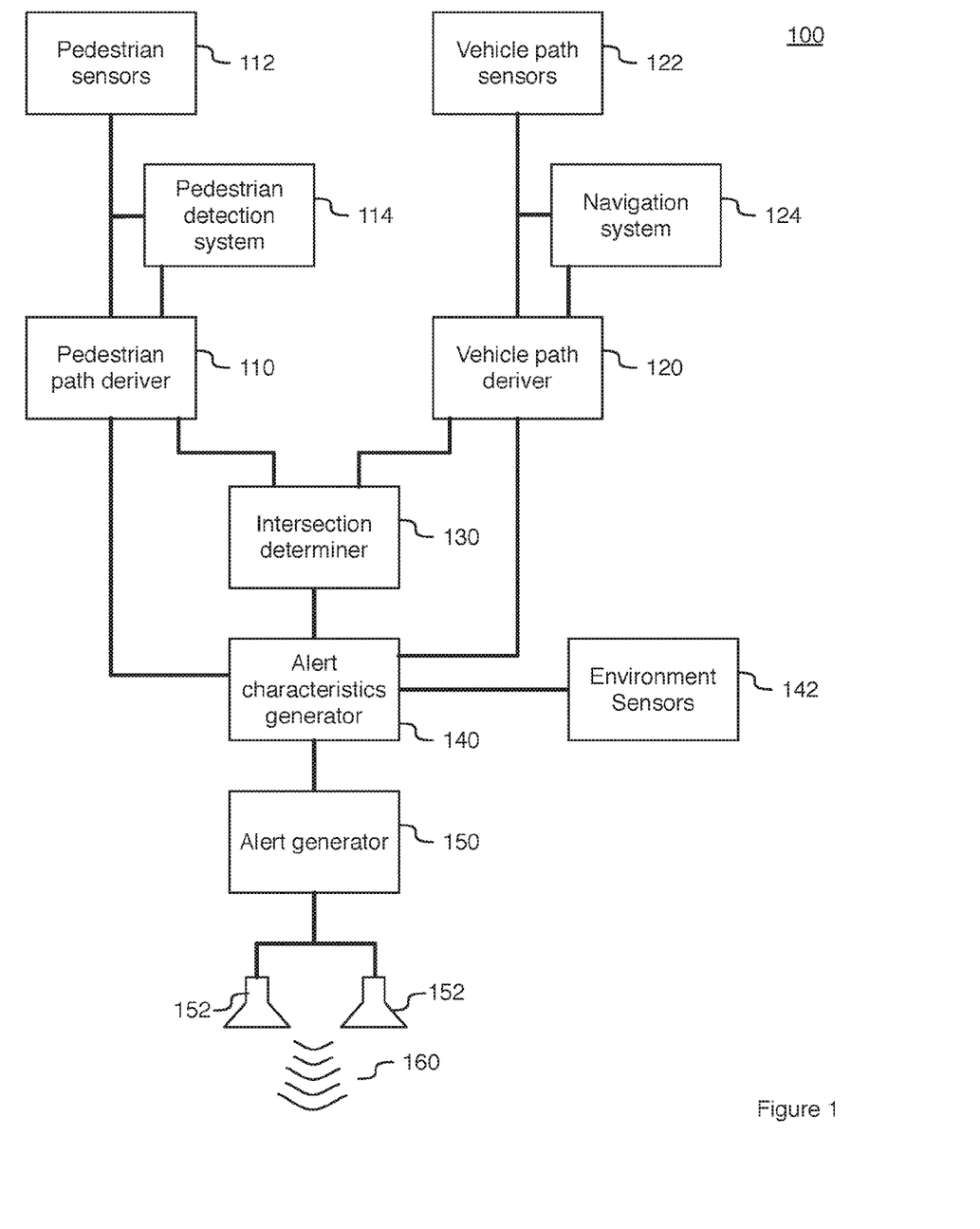
FIG. 1 is a schematic representation of a system for pedestrian alert.

FIG. 1 is a schematic representation of a system for pedestrian alert 100. The system for pedestrian alert 100 may comprise a pedestrian path deriver 110, a vehicle path deriver 120, an intersection determiner 130, an alert characteristic generator 140 and an alert generator 150.

Figure 2:
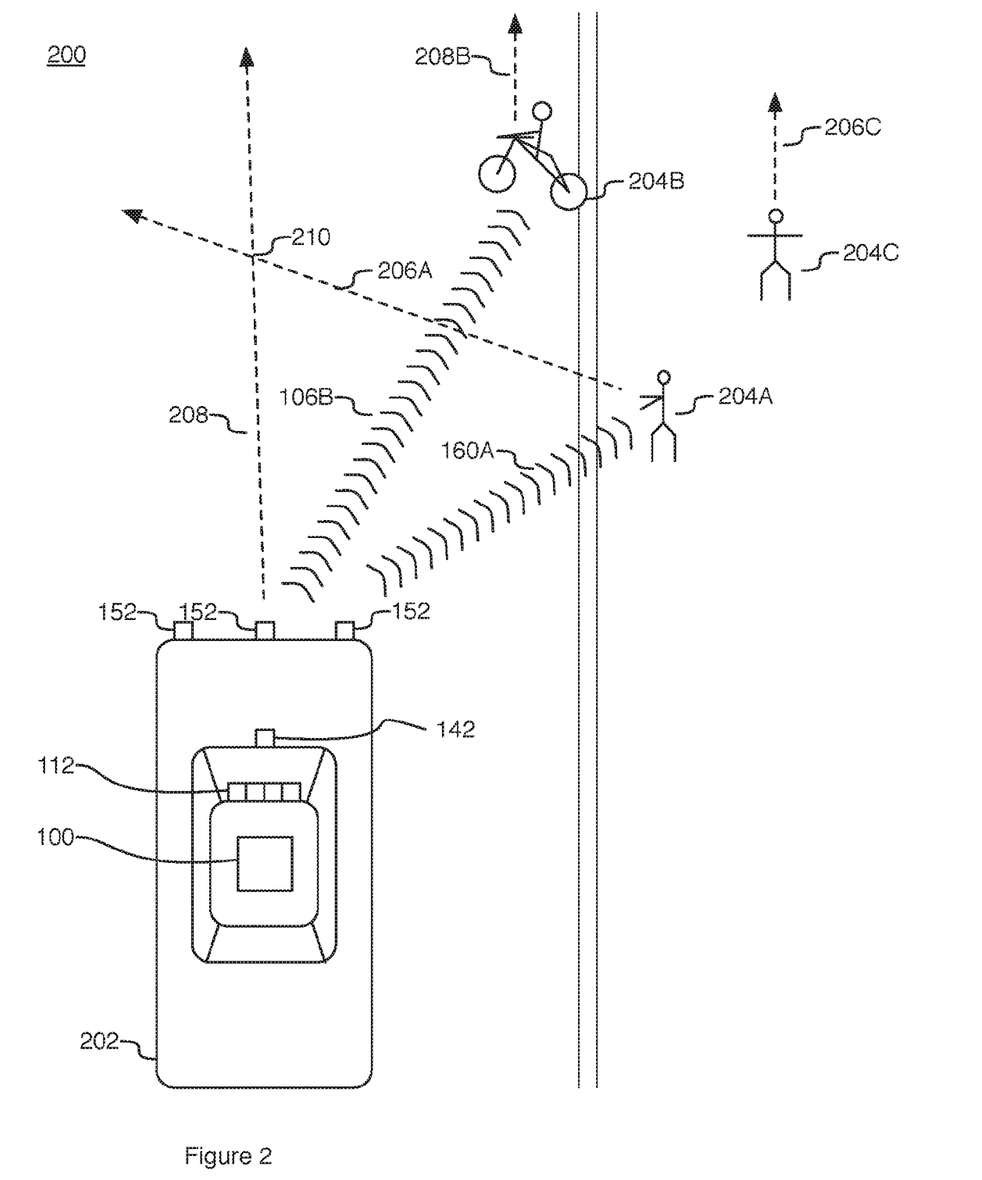
FIG. 2 is a schematic representation of a scenario in which the system for pedestrian alert may be used.

FIG. 2 is a schematic representation of a scenario in which the system for pedestrian alert 100 may be used from an overhead perspective. Included in the example scenario 200 are a motor vehicle 202 and three pedestrians 204A, 204B and 204C (collectively or generically pedestrians 204). Pedestrian 204B is a cyclist while pedestrians 204A and 204B are on foot. The example motor vehicle 202 is equipped and/or has installed therein a system for pedestrian alert 100, one or more pedestrian sensors 112, one or more emitters 152 and one or more environment sensors 142. The scenario 200 also includes a respective predicted path of travel for the pedestrian 206A, 206B and 206C (collectively or generically predicted path of travel for the pedestrian 206) for each of the pedestrians 204A, 204B and 204C. The scenario 200 also includes a predicted path of travel for the motor vehicle 208. The scenario 200 further includes a respective alert signal 160A and 160B (collectively or generically alert signal 160) for each of pedestrians 204A and 204B.

Referring again to FIG. 1, the pedestrian path deriver 110 may receive input signals and data from pedestrian sensors 112 and/or a pedestrian detection system 114. The pedestrian sensors 112 may include one or more of optical/vision sensors (e.g. cameras), infrared sensors, ultrasonic sensors, laser/LIDAR, radar, inductive loop and other similar well know sensors for detecting the presence and position of pedestrians 204 that are in proximity of the motor vehicle 202. The pedestrian detection system 114 may also, or alternatively, receive input signals and data from pedestrian sensors 112. The pedestrian detection system 114 may be any known system or sub-system for detecting the presence and position of pedestrians 204 that are in proximity of the motor vehicle 202. The pedestrian detection system 114 may be a standalone system or may be a sub-system of another advanced driver assistance system (ADAS) equipped in the motor vehicle 202 such as, for example, a pedestrian warning system that provides a warning to the motor vehicle operator (e.g. driver) that a pedestrian 204 has been detected and that may additional initiate braking action. The pedestrian detection system 114 may be able to recognize and distinguish different pedestrian types such as, for example, pedestrians on foot, cyclists and animals and may provide this information to other components of the system for pedestrian alert 100 such as the pedestrian path deriver 110 and alert characteristics generator 140.

The pedestrian path deriver 110 may derive a predicted path of travel for a detected pedestrian based on, for example, a time sequence analysis of a series of positions (e.g. locations) and times where the pedestrian 204 has been detected. The analysis may use any known technique including, for example, numerical analysis methods such as extrapolation or regression to generate future predicted positions (locations) for the pedestrian 204 thereby deriving a predicted path of travel for the pedestrian 206. The predicted path of travel for the pedestrian 206 may include any of a bearing, projected path algorithm/function and a pedestrian speed. The predicted path of travel for the pedestrian 206 may indicate that the pedestrian 204 is substantially stationary when that is the case.

The vehicle path deriver 120 may receive input signals and data from vehicle path sensors 122 and/or navigation system 124. The vehicle path sensors 122 may include one or more sensor associated with vehicle speed, steering angle, global positioning system (GPS), yaw, compass bearing, road/lane detection, turn signal operation, road map, route and other similar sensors. The navigation system 124 may also or alternatively receive input signals and data from vehicle path sensors 122. The navigation system 124 may be any known system or sub-system for navigating a selected route and/or determining the location of the motor vehicle 202 relative to a road map.

The vehicle path deriver 120 may derive a predicted path of travel for the motor vehicle 208 based on, for example, applying any known projection algorithms to the signals and data received from the vehicle path sensors 122. Alternatively, or in addition, the vehicle path deriver 120 may derive the predicted path of travel for the motor vehicle 208 base on signals and data received from the navigation system 124 including, for example, a selected route and/or road map data. The predicted path of travel for the motor vehicle 208 includes future predicted positions (locations) for the motor vehicle 202. The predicted path of travel for the motor vehicle 208 may include any of a bearing, projected path algorithm, route and a motor vehicle speed.

The intersection determiner 130 receives the predicted path of travel for the pedestrian 206 from the pedestrian path deriver 110 and the predicted path of travel for the motor vehicle 208 from the vehicle path deriver 120. The intersection determiner 130 may use future time sequence analysis to determine if the predicted path of travel for the pedestrian 206 will intersect the predicted path of travel for the motor vehicle 208 at some future point in time. The determination may result in a determination that intersection 210 will occur or will not occur. In addition to the predicted path of travel for the pedestrian 206 and the predicted path of travel for the motor vehicle 208, the intersection determination may take into account other factors such as, for example, the width of the motor vehicle, turning radius of the motor vehicle, road map information and other similar factors. When a determination is made that intersection 210 will occur (e.g. a collision between the pedestrian 204A and the motor vehicle 202 is imminent), one or more intersection locations and corresponding intersection times where the intersection 210 will occur may be calculated (e.g. predicted).

The alert characteristics generator 140 receives the results of the intersection determination (e.g. intersection will occur or intersection will not occur) and when the determination is that intersection 210 will occur, may also receives the one or more intersection locations and corresponding intersection times from the intersection determiner 140. The alert characteristic generator 140 may also receive the predicted path of travel for the pedestrian 206 from the pedestrian path deriver 110 and the predicted path of travel for the motor vehicle 208 from the vehicle path deriver 120. The alert characteristic generator 140 may also receive an indication of pedestrian type (e.g. pedestrian on foot, cyclist or animal) from the pedestrian path deriver 110 or the pedestrian detector 114. The alert characteristic generator 140 may also receive signals or data from one or more environment sensors 142 such as, for example, one or more externally mounted microphones for detecting background noise levels in the environment through which the motor vehicle 202 is traveling. The alert characteristics generator 140 generates characteristics of an alert signal in response to the received inputs described above. The alert signal 160 is a signal that is emitted from the motor vehicle 202 to alert the pedestrian 204 of presence and location of the motor vehicle 202 and of a potential intersection (e.g. collision) with the motor vehicle 202.

The alert characteristics generated by the alert characteristics generator 140 may include one or more of a loudness (a.k.a. sound pressure level, volume or gain), pitch or frequency, alert signal content, direction and other alert characteristics. For example, the loudness may be adjusted up or down in response to the level of environmental noise detected by the external microphones 142 in order to achieve a substantially constant audibility for a specific human hearing capability at a range appropriate to the speed of the motor vehicle. In another example, the loudness may be adjusted up or down based on the substantial direction of travel (e.g. toward or away from) relative to the direction of travel of the motor vehicle 202. The loudness may also be increased over time when the intersection determiner 130 continues to determine that intersection will occur (e.g. a collision between the pedestrian 204 and the motor vehicle 202 is imminent) after the alert signal 160 has been emitted for some time.

The alert signal content may include impulse sounds. Impulsive sound sources that contain transient broadband information are, in general, more easily localized than continuous tone or periodic signals. The sound signal content may be adapted to be more easily audible by people (e.g. the elderly) with most common forms of hearing loss. The sound signal content may, for example, include sounds that produce most energy below 2.5 kHz thereby adapting the alert signal to the most common form of hearing loss which is a "noise-induced notch" that occurs around 3 kHz. Such a sound signal content may also have greater range at the same amplitude compared to a signal with more energy in the higher frequency content because sound absorption in air increases with frequency. The sound signal content may alternatively or in addition include a component specifically audible to animals (e.g. pets or wildlife) either all of the time or when the detected pedestrian type is animal rather than human.

The generated alert characteristics may include a direction that changes over time in response to the predicted path of travel for the pedestrian 206 and the predicted path of travel for the motor vehicle 208 in order for the alert signal 160 to be emitted in the direction of the pedestrian 204 even as the motor vehicle 202 and/or pedestrian 204 continue to move relative to each other over time.

The alert generator 150 receives the alert characteristics generated by the alert characteristics generator 140 and generates an alert signal 160 that is emitted by the emitters 152. The emitters 152 may include one or more of fixed audio transducers (a.k.a. loudspeakers), steerable audio transducers, ultrasonic transducers or other similar mechanisms that can be used to generate a directionally controllable audio signal (a.k.a. alert signal 160) to be directed at the pedestrian 204. Alert signal 160 directionality may be achieved from an array of loudspeakers using known phase and amplitude modulation (e.g. phase array) techniques. Alternatively, or in addition, alert signal 160 directionality may be achieved by selecting one or more audio transducers from an array of transducers or by steering one or more steerable audio transducers.

The alert signal 160 may be generated in addition to, as a modification to, or in place of, another warning signal such as, for example, an omnidirectional or fixed direction pedestrian warning that is required for electric vehicles in some jurisdictions.

The alert signal 160 may be of a higher in frequency so that its source can be more easily located by the pedestrian 204, is more attention grabbing than the regular warning sound, and is emitted at a higher volume. In addition the alert sound volume can be continually increased if the system 100 continues to determine that pedestrian and vehicle paths will intersect.

Operation of the system for pedestrian alert 100 may be ongoing over time. Each of the inputs received from the various sensors and each of the outputs generated by the components of the system 100 described herein may be reasserted, updated, added or removed on a continuous or periodic basis over time. Each of the derivations, determinations and generations generated by the components of system 100 describe herein may be recalculated, reassessed or regenerated on a continuous or periodic basis over time.

The system can detect a cyclist 204B travelling in the same direction as the vehicle (in the same or an adjacent lane) and emit an alert signal 160 having different alert characteristics that is intended to draw the cyclists 204B attention to the presence of the motor vehicle 202 rather than warn of an impact.

The system for pedestrian alert 100 may be used for either forward travel only or both forward and backward (reversing) travel of the motor vehicle 202. In addition the system for pedestrian alert 100 may be used in either or both of vehicles mandated to have static pedestrian warning systems installed (e.g. electric vehicles) and vehicles that are not so mandated (e.g. internal combustion engine driven vehicles).

Figure 3:
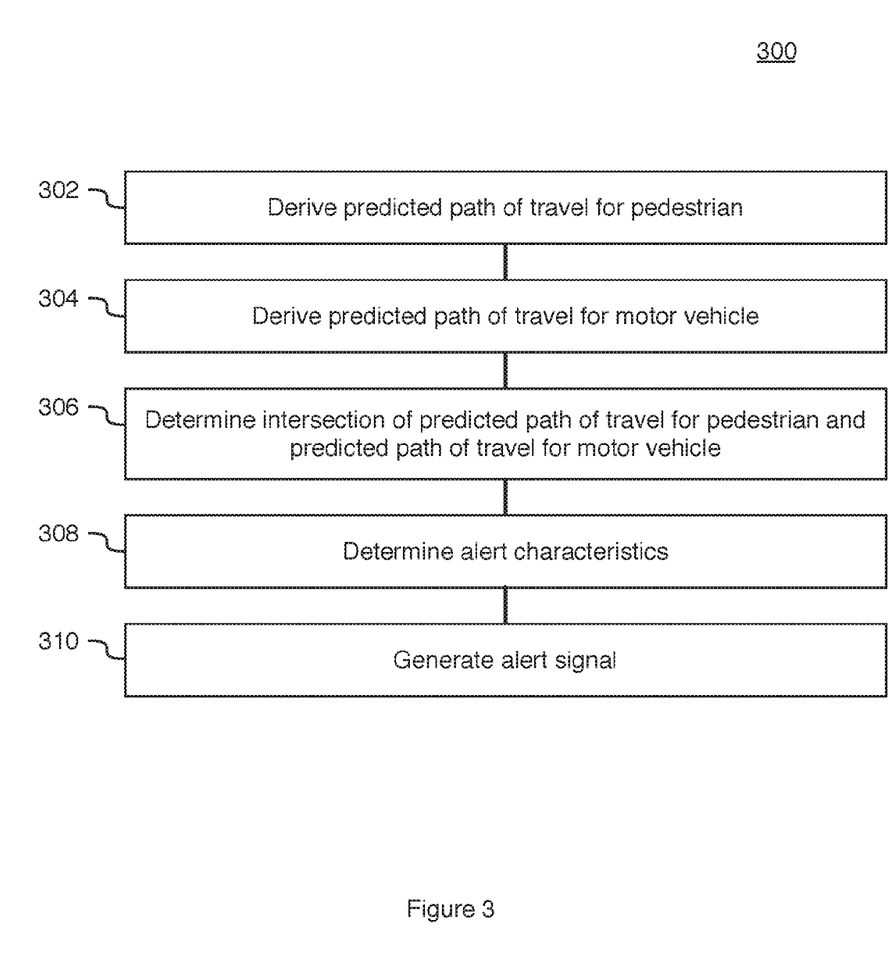
FIG. 3 is a representation of a method for pedestrian alert.

FIG. 3 is a representation of a method for pedestrian alert. The method for pedestrian alert 300 may be, for example, implemented using any of the systems 100 and 400 described herein with reference to FIGS. 1 and 4. The method for pedestrian alert 300 may include the following actions.

Deriving a predicted path of travel for the pedestrian 302. The predicted path of travel for a pedestrian 206 may be derived using any known techniques including, for example, numerical analysis methods such as those described above. The derivation may be based on signals and data received from pedestrian sensors 112 and/or pedestrian detection system 114. Multiple predicted paths of travel for pedestrian 206A, 206B and 206C may be derived concurrently, each for a respective pedestrian 204A, 204B and 204C.

Deriving a predicted path of travel for the motor vehicle 304. The predicted path of travel for the motor vehicle 208 may be derived by applying any known projection algorithms to the signals and data received from the vehicle path sensors 122. Alternatively, or in addition, the vehicle path deriver 120 may derive the predicted path of travel for the motor vehicle 208 base on signals and data received from the navigation system 124 including, for example, a selected route and/or road map data.

Determining intersection of the predicted path of travel for the pedestrian and the predicted path of travel for the motor vehicle 306. Determination of intersection may use future time sequence analysis to determine if the predicted path of travel for the pedestrian 206 will intersect the predicted path of travel for the motor vehicle 208 at some future point in time. The determination may result in a determination that intersection 210 will occur or will not occur. In addition to the predicted path of travel for the pedestrian 206 and the predicted path of travel for the motor vehicle 208, the intersection determination may take into account other factors such as, for example, the width of the motor vehicle, turning radius of the motor vehicle, road map information and other similar factors. When a determination is made that intersection 210 will occur (e.g. a collision between the pedestrian 204A and the motor vehicle 202 is imminent), one or more intersection locations and corresponding intersection times where the intersection 210 will occur may be calculated (e.g. predicted). The predicted path of travel for the pedestrian 206 may not intersect the predicted path of travel for the motor vehicle 208 when the predicted path of travel for the pedestrian 206B is substantially parallel to the predicted path of travel for the motor vehicle 208, for example, in the case of cyclist 204B. The predicted path of travel for the pedestrian 206 may not intersect the predicted path of travel for the motor vehicle 208 when the predicted path of travel for the pedestrian 206C is laterally displaced from and non-convergent on the predicted path of travel for the motor vehicle 208, for example, in the case of pedestrian 204C walking on a sidewalk or on the roadside.

Determining alert characteristics 308. Determination of alert characteristics uses the results of the intersection determination act 306 (e.g. intersection will occur or intersection will not occur). When the determination is that intersection 210 will occur, determination of alert characteristics may also use the one or more intersection locations and corresponding intersection times generated in the intersection determination act. Determination of alert characteristics may also use the predicted path of travel for the pedestrian 206 and the predicted path of travel for the motor vehicle 208. Determination of alert characteristics may also use an indication of pedestrian type (e.g. pedestrian on foot, cyclist or animal). Determination of alert characteristics may also use signals or data from one or more environment sensors 142 such as, for example, one or more externally mounted microphones for detecting background noise levels in the environment through which the motor vehicle 202 is traveling. Determination of alert characteristics includes generating characteristics of an alert signal in response to the received inputs described above. The alert signal 160 is a signal that is emitted from the motor vehicle 202 to alert the pedestrian 204 of presence and location of the motor vehicle 202 and optionally of a potential intersection (e.g. collision) with the motor vehicle 202.

The alert characteristics that are determined (e.g. generated) may include one or more of a loudness, pitch or frequency, alert signal content, direction and other alert characteristics. For example, the loudness and pitch characteristics that are determined for an alert signal 160A that will be directed at a pedestrian 204A for whom an intersection has been determined will typically be louder and sharper (e.g. more attention seeking) than the loudness and pitch characteristics that are determined for an alert signal 160B that will be directed at a pedestrian 204B that is proximate to the motor vehicle 202 but for whom no intersection has been determined. The alert characteristic such as loudness and pitch determined for pedestrian 204A may be determined to ensure that the alert signal 160A attracts the pedestrian's attention and warns the pedestrian 204A of the danger posed by an imminent collision. In the case of pedestrian 204B the alert characteristics such as loudness and pitch may be determined so that the alert signal 160B alerts the pedestrian 204B of the presence of the motor vehicle 202 without being startling or distracting. For pedestrian 206C who is not in close proximity to the motor vehicle 202 and for whom no intersection has been determined the alert characteristic may be determined so that no alert signal 160 is generated.

The determined loudness characteristic may be adjusted up or down in response to the level of environmental noise detected by the external microphones 142 in order to achieve a substantially constant audibility for a specific human hearing capability at a range appropriate to the speed of the motor vehicle 202. The loudness may also be increased over time when the intersection determination act 306 continues to determine that intersection will occur (e.g. a collision between the pedestrian 204A and the motor vehicle 202 is imminent) even after the alert signal 160 has been emitted for some time.

The alert signal content may include impulse sounds. Impulsive sound sources that contain transient broadband information are, in general, more easily localized than continuous tone or periodic signals. The sound signal content may include a component specifically audible to animals (e.g. pets or wildlife) either all of the time or when the detected pedestrian type is animal rather than human.

The generated alert characteristics may include a direction that changes over time in response to the predicted path of travel for the pedestrian 206 and the predicted path of travel for the motor vehicle 208 in order for the alert signal 160 to be emitted in the direction of the pedestrian 204 even as the motor vehicle 202 and/or pedestrian 204 continue to move relative to each other over time.

Determination of alert characteristics corresponding to one or more alert signals 160 may be determine concurrently where each set of alert characteristics is associated with a respective one of one or more pedestrians (e.g. 204A, 204B and 204C).

Generating the alert signal 310. Generation of the alert signal uses the alert characteristics resulting from the alert characteristics determination act 308 and generates an alert signal 160 that is emitted by the emitters 152. Alert signal 160 directionality may be achieved using any of the mechanisms described above with reference to signal generator 150 responsive to direction characteristics resulting from the alert characteristics determination act 308. The direction of the alert signal 160 may be changed or updated over time in response to a changing or updated direction characteristic. Other characteristic of the generated alert signal 160 such as, for example, loudness may also change over time in response to changes made in the alert characteristics determination act 308. One or more different alert signals such as 160A and 160B may be generated concurrently responsive to respective corresponding sets of alert characteristics resulting from the alert characteristics determination act 308.

Other embodiments of a method for pedestrian alert may include more, fewer, or different acts than those illustrated in FIG. 3. The method for pedestrian alert 300 may be ongoing over time. Each of the inputs received from the various sensors and each of the outputs generated by acts of the method 300 described herein may be reasserted, updated, added or removed on a continuous or periodic basis over time. Each of the derivations, determinations and generations generated by the acts of method 300 describe herein may be reassessed or regenerated on a continuous or periodic basis over time.

Figure 4:
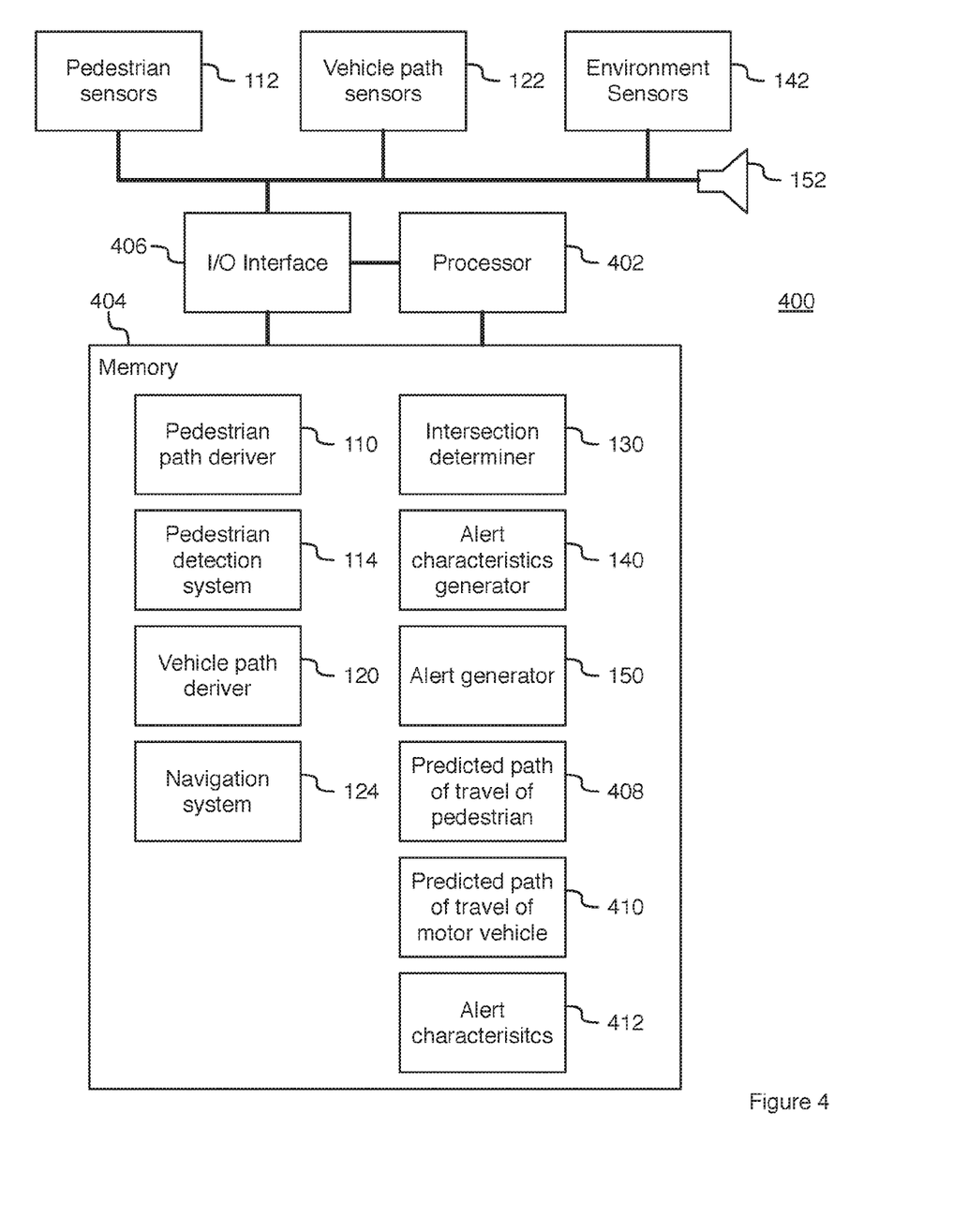
FIG. 4 is a further schematic representation of a system for pedestrian alert.

FIG. 4 is a schematic representation of a system for pedestrian alert. The system 400 comprises a processor 402, memory 404 (the contents of which are accessible by the processor 402) and an I/O interface 406.

The processor 402 may comprise a single processor or multiple processors that may be disposed on a single chip, on multiple devices or distributed over more that one system. The processor 402 may be hardware that executes computer executable instructions or computer code embodied in the memory 404 or in other memory to perform one or more features of the system. The processor 402 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 404 may comprise a device for storing and retrieving data, processor executable instructions, or any combination thereof. The memory 404 may include non-volatile and/or volatile memory, such as a random access memory (RAM), a read-only memory (ROM), an erasable programmable read-only memory (EPROM), or a flash memory. The memory 404 may comprise a single device or multiple devices that may be disposed on one or more dedicated memory devices or on a processor or other similar device. Alternatively or in addition, the memory 404 may include an optical, magnetic (hard-drive) or any other form of data storage device.

The memory 404 may store instructions which when executed using the process 402 may cause the system 400 to render the functionality associated with pedestrian path deriver 110, vehicle path deriver 120, intersection determiner 130, alert characteristics generator 140 and alert generator 150 as described herein. The computer code may be written in any computer language, such as C, C++, assembly language, channel program code, and/or any combination of computer languages. In addition the memory 404 may store the predicted path of travel of pedestrian 408, predicted path of travel of motor vehicle 410 and alert characteristics 412.

The I/O interface 406 may be used to connect devices such as, for example, pedestrian sensors 112, vehicle path sensors 122, environment sensors 142, emitters 152 and to other components of the system 400.

All of the disclosure, regardless of the particular implementation described, is exemplary in nature, rather than limiting. The systems 100 and 400 may include more, fewer, or different components than illustrated in FIGS. 1 and 4. Furthermore, each one of the components of systems 100 and 400 may include more, fewer, or different elements than is illustrated in FIGS. 1 and 4. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for pedestrian alert have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for issuing a pedestrian alert comprising:
deriving a pedestrian path representing a projected path for a pedestrian;
deriving a vehicle path representing a projected path for a vehicle;
determining an intersection of the pedestrian path and the vehicle path;
determining an alert characteristic responsive to the determined intersection; and
emitting an alert signal from the vehicle responsive to the determined alert characteristic using an array of loudspeakers, wherein the determined alert characteristic includes a direction and the alert signal is emitted in a direction responsive to the direction characteristic, and the direction of the emitted signal from the array of loudspeakers is electronically steered using phase modulation;
wherein the emitted alert signal draws the attention of the pedestrian to the presence of the vehicle to mitigate the likelihood of a collision between the vehicle and the pedestrian.

2. The method for issuing a pedestrian alert of claim 1, where one or more of the acts are repeated on a continuous or periodic basis over time and where the direction of the emitted alert signal changes over time in response to changes to the direction characteristic.

3. The method for issuing a pedestrian alert of claim 1, wherein the direction of the emitted signal is further electronically steered using an amplitude modulation, selecting one or more audio transducers from an array of transducers or steering one or more steerable audio transducers.

4. The method for issuing a pedestrian alert of claim 1, wherein the determined alert characteristic includes any of: loudness, pitch, or a signal content characteristic.

5. The method for issuing a pedestrian alert of claim 4, where the loudness characteristic is adjusted responsive to an environmental noise level.

6. The method for issuing a pedestrian alert of claim 4, where the signal content characteristic is adapted to be audible by a human.

7. The method for issuing a pedestrian alert of claim 1, where the acts of deriving the pedestrian path, determining the intersection, determining the alert characteristic and emitting the alert signal occur concurrently for respective ones of two or more pedestrians.

8. The method for issuing a pedestrian alert of claim 1, where the determining of the intersection continues to occur after the alert signal has been emitted for some time.

9. A system for issuing a pedestrian alert comprising:
a pedestrian path deriver to derive a pedestrian path representing a projected path for a pedestrian;
a vehicle path deriver to derive a vehicle path representing a projected path for a vehicle;
an intersection determiner to determine an intersection of the pedestrian path and the vehicle path;
an alert characteristic generator to determine an alert characteristic responsive to the determined intersection; and
an alert generator to emit an alert signal from the vehicle responsive to the determined alert characteristic using an array of loudspeakers, wherein the determined alert characteristic includes a direction and the alert signal is emitted in a direction responsive to the direction characteristic, and the direction of the emitted signal from the array of loudspeakers is electronically steered using phase modulation;
wherein the emitted alert signal draws the attention of the pedestrian to the presence of the vehicle to mitigate the likelihood of a collision between the vehicle and the pedestrian.

10. The system for issuing a pedestrian alert of claim 9, where one or more of the components of the system operate on a continuous or a periodic basis over time and where the direction of the emitted alert signal changes over time in response to changes to the direction characteristic.

11. The system for issuing a pedestrian alert of claim 9, where the direction of the emitted signal is further electronically steered using an amplitude modulation, selecting one or more audio transducers from an array of transducers and steering of one or more steerable audio transducers.

12. The system for issuing a pedestrian alert of claim 9, where the determined alert characteristics includes any of: loudness, pitch, or a signal content characteristic.

13. The system for issuing a pedestrian alert of claim 12, wherein the loudness characteristic is adjusted responsive to an environmental noise level.

14. The system for issuing a pedestrian alert of claim 12, where the signal content characteristic is adapted to be audible by a human.

15. The system for issuing a pedestrian alert of claim 9, where the pedestrian path deriver, the intersection determiner, the alert characteristics generator and the alert generator operate for two or more pedestrians concurrently.

16. The system for issuing a pedestrian alert of claim 9, where the determined intersection determines if the intersection occurs later in time.

17. A method for issuing a pedestrian alert comprising:
deriving a pedestrian path representing a projected path for a pedestrian;
deriving a vehicle path representing a projected path for a vehicle;
determining an intersection of the pedestrian path and the vehicle path;
determining an alert characteristic responsive to the determined intersection; and
emitting an alert signal from the vehicle responsive to the determined alert characteristic;
wherein a likelihood of a collision between the motor vehicle and the pedestrian is mitigated when the emitted alert draws the attention of the pedestrian to the presence of the vehicle;
wherein the determined alert characteristic includes any of: a loudness, a pitch or a signal content;
where a signal content characteristic includes an impulsive sound containing transient broadband information, and wherein the source of the alert signal is more easily localized by the pedestrian.

18. A system for issuing a pedestrian alert comprising:
a pedestrian path deriver to derive a pedestrian path representing a projected path for a pedestrian;
a vehicle path deriver to derive a vehicle path representing a projected path for a vehicle;
an intersection determiner to determine an intersection of the pedestrian path and the vehicle path;
an alert characteristic generator to determine alert characteristic responsive to the determined intersection; and
an alert generator to emit an alert signal from the vehicle responsive to the determined alert characteristics;
wherein the likelihood of a collision between the motor vehicle and the pedestrian is mitigated when the emitted alert draws the attention of the pedestrian to the presence of the vehicle
wherein the determined alert characteristic includes any of: a loudness, a pitch, or a signal content;
where the signal content characteristic includes an impulsive sound containing transient broadband information, and wherein the source of the alert signal is more easily localized by the pedestrian.

19. A non-transitory machine-readable medium encoded with machine-executable instructions, wherein execution of the machine-executable instructions is for:
deriving a pedestrian path representing a projected path for a pedestrian;
deriving a vehicle path representing a projected path for a vehicle;
determining an intersection of the pedestrian path and the vehicle path;
determining an alert characteristic responsive to the determined intersection; and
emitting an alert signal from the vehicle responsive to the determined alert characteristic using an array of loudspeakers, wherein the determined alert characteristic includes a direction and the alert signal is emitted in a direction responsive to the direction characteristic, and the direction of the emitted signal from the array of loudspeakers is electronically steered using phase modulation;
wherein the emitted alert signal draws the attention of the pedestrian to the presence of the vehicle to mitigate the likelihood of a collision between the vehicle and the pedestrian.

20. The non-transitory machine-readable medium of claim 19, wherein one or more of the instructions are repeated on a continuous or a periodic basis over time and wherein the direction of the emitted alert signal changes over time in response to changes to the direction characteristic.

21. The non-transitory machine-readable medium of claim 19, wherein the direction of the emitted signal is further electronically steered using an amplitude modulation, and the operations further comprise selecting one or more audio transducers from an array of transducers or steering one or more steerable audio transducers.

22. The non-transitory machine-readable medium of claim 19, wherein the determined alert characteristic includes any of: loudness, pitch, or a signal content characteristic.

23. The non-transitory machine-readable medium of claim 22, wherein the loudness characteristic is adjusted in response to an environmental noise level.

24. The non-transitory machine-readable medium of claim 22, wherein the signal content characteristic is adapted to be audible by a human.

25. The non-transitory machine-readable medium of claim 19, wherein the deriving the pedestrian path, determining the intersection, determining the alert characteristic and emitting the alert signal occur concurrently for respective ones of two or more pedestrians.

26. The non-transitory machine-readable medium of claim 19, wherein the determining of the intersection occurs after the alert signal has been emitted for a time period.

27. A non-transitory machine-readable medium encoded with machine-executable instructions, wherein execution of the machine-executable instructions is for:
deriving a pedestrian path representing a projected path for a pedestrian;
deriving a vehicle path representing a projected path for a vehicle;
determining an intersection of the pedestrian path and the vehicle path;
determining an alert characteristic responsive to the determined intersection; and
emitting an alert signal from the vehicle responsive to the determined alert characteristic;
wherein a likelihood of a collision between the motor vehicle and the pedestrian is mitigated when the emitted alert draws the attention of the pedestrian to the presence of the vehicle;
wherein the determined alert characteristic includes any of: a loudness, a pitch or a signal content;
where a signal content characteristic includes an impulsive sound containing transient broadband information, and wherein the source of the alert signal is more easily localized by the pedestrian.

* * * * *